United States Patent [19]

Cotts

[11] Patent Number: 4,832,869

[45] Date of Patent: May 23, 1989

[54] HIGHLY CONDUCTING POLYMERS AND MATERIALS FOR POLYMERIC BATTERIES

[75] Inventor: David B. Cotts, Menlo Park, Calif.

[73] Assignee: SRI International, Menlo Park, Calif.

[21] Appl. No.: 860,093

[22] Filed: May 6, 1986

[51] Int. Cl.$^4$ .............................................. H01B 1/00
[52] U.S. Cl. ..................... 252/500; 252/518; 524/80; 524/401; 524/404; 524/415; 524/408; 524/429; 528/422; 528/423; 528/183; 528/185; 528/337; 528/345; 528/266
[58] Field of Search ................. 252/500, 518; 524/80, 524/401, 404, 414, 415, 408, 429; 528/266, 44, 422, 423, 183, 185, 337, 345; 429/213

[56] References Cited

U.S. PATENT DOCUMENTS

| | | | |
|---|---|---|---|
| 4,375,427 | 3/1983 | Miller et al. | 252/512 |
| 4,414,080 | 11/1983 | Williams | 204/129 |
| 4,502,980 | 3/1985 | Denisevich et al. | 252/500 |
| 4,505,843 | 3/1985 | Suzuki et al. | 252/518 |
| 4,505,844 | 3/1985 | Denisevich | 252/500 |
| 4,519,538 | 5/1985 | Papir | 252/500 |
| 4,519,937 | 5/1985 | Papir | 252/500 |
| 4,519,940 | 5/1985 | Schroeder et al. | 252/500 |
| 4,520,086 | 5/1985 | Skotheim | 429/192 |
| 4,522,745 | 6/1985 | Kurkov | 252/500 |
| 4,533,693 | 8/1985 | Wolfe et al. | 524/417 |
| 4,535,039 | 8/1985 | Naarmann et al. | 429/213 |
| 4,543,402 | 9/1985 | Traynor | 429/213 |

OTHER PUBLICATIONS

Y. S. Papir, PCT–Patent Application No. US82/01801, published 7-7-86.

W. R. Hentlen, *Journal of Organic Chemistry*, vol. 41, pp. 1412–1416.

T. W. Campbell et al., *Journal of Organic Chemistry*, vol. 28, pp. 2069–2079, (1963).

V. M. Hartel et al., *DeAngewandte Macromlecular Chemie*, vol. 29/30, pp. 307–347 (1963).

C. D. Duke et al, "Conductive Polymers", *Encyclopedia of Chem. Tech.*, 3rd Ed., vol. 18 pp. 755–793 (1982).

W. S. Hunig "Stable Radical Ions", IUPAC Pure and Applied Chem; vol. 15 109ff, (1961).

D. B. Cotts and Z. Reyes, Air Force Systems Command Report, "New Polymeric Materials Expected to Have Superior Properties for Space-Based Use", Jul. 1985.

*Primary Examiner*—Josephine Barr
*Attorney, Agent, or Firm*—Phillips, Moore, Lempio & Finley

[57] ABSTRACT

The present invention relates to electrically conducting organic polymers useful for spacecraft and other uses. The invention describes a number of conductive organic polymers having an electrical conductivity greater than $10^{-2}$ ohm$^{-1}$ cm$^{-1}$. The structures of the organic polymers contain heteroatoms such as oxygen, nitrogen and sulfur which are found in alkylene, aralkyl and aryl groups. Optionally, organic and inorganic dopants are used to increase the conductivity of the polymer. These materials are useful for conductive coatings and shielding applications, in energy storage and conversion devices, as battery anodes or cathodes, semiconductor materials and in integrated electroptics for switching, logic and display.

12 Claims, No Drawings

HIGHLY CONDUCTING POLYMERS AND MATERIALS FOR POLYMERIC BATTERIES

BACKGROUND OF THE INVENTION

A portion of the research on the present invention was performed for the United States Air Force Systems Command under Contract No. [F-19628-81-C-0075], and the United States Government has an interest in the subject matter described herein.

FIELD OF THE INVENTION

The present invention relates to electrically conducting organic polymers suitable for spacecraft and other uses. More particularly, the invention relates to conductive organic polymers having an electrical conductivity greater than $10^{-8}$ ohm$^{-1}$ cm$^{-1}$ where the conductive polymer is capable of forming a stable radical ion chemical structures are selected from those having an odd number of $\pi$-electrons spread over an even number of atoms as those having an even number of electrons spread over an odd number of atoms. These are polymeric structures which may have coil-like or extended chain (rod-like) structures. Preferably, the electroactive polymer has one of the structures shown and described hereinbelow. Optionally, an organic or inorganic dopant is used to increase the conductive properties.

ART OF INTEREST

Conductive organic polymers have been of interest in the research community for a number of years.

For instance, V. P. Kurkov in U.S. Pat. No. 4,522,745 discloses a tractable and reversible electroactive polymer which comprises a charged organic polymer backbone of recurring units of a fused 5, 6, 5-membered aromatic heterocyclic ring system wherein the 5-membered rings contain at least one nitrogen and a second hetero-atom selected from the groups consisting of oxygen, sulfur, selenium, tellurium and substituted nitrogen and a sufficient concentration of a charge-compensating ionic dopants combined thereon.

In U.S. Pat. No. 4,535,039, H. Naarmann et al. disclose that in batteries or electrochemical stores, the active material of the cathode and/or the anode consists of one or more electrically conductive organic polymers which have an electrical conductivity of greater than $10^{-2}$ ohm$^{-1}$ cm$^{-1}$ and contain electro-chemically oxidizable and/or reducible redox groups which have a defined structure and are capable of forming two or more stable oxidation states, which preferably are reversibly interconvertible. A large number of chemical structures are disclosed wherein the electrically conductive redox polymer is a p-type or n-type doped polyene which contains the redox group as side groups bonded to the polymer main chain. A large number of polymer structures are disclosed and claimed. The dopants include the $PF_6^-$, $ClO_4^-$, $AsF_4^-$, $AsF_6^-$, $BF_4^-$, $SbF_6^-$, $SbCl_6^-$, $SO_3CF_3^-$, $NO_3^-$, $POF_4^-$, $CN^-$, $F^-$, $Cl^-$, $Br^-$, $I^-$, $I_3^-$, $SiF_5^-$, $HSO_4^-$, acetate, benzoate, tosylate, and mixtures thereof.

In U.S. Pat. No. 4,519,937, Y. S. Papir discloses tractable doped electroactive polymers, comprising recurring diradical units of a fused nitrogen-containing unsaturated heterocyclic ring system, which are fabricated from the virgin polymer by contacting the polymer with donor or acceptor conductivity modifier atoms or groups of atoms. The diradical units are directly linked to one another or may be connected to one another via connecting units. A connecting unit is defined as any atom or group of atoms which can link the hereinabove diradicals together into a polymer chain.

In U.S. Pat. No. 4,519,938, Y. S. Papir discloses tractable doped electroactive polymers comprising recurring units of a heterocyclic ring system and a sufficient concentration of charge compensating ionic dopants associated therewith. The linear polymer backbone comprises diradical repeat units having a heterocyclic ring system with the proviso that the heterocyclic ring system does not include fused 5, 6-membered heterocyclic ring systems wherein two heteroatoms are in the 5-membered ring.

In PCT Application No. US82/01801, Y. S. Papir discloses battery electrodes and batteries fabricated with mono and fused unsaturated heterocyclic ring system polymers. These polymers form the anode or cathode and permit the fabrication of batteries in any desired configuration or shape. Specifically, the linear polymers comprise diradical repeat units consisting of a heterocyclic ring system, including at least one Group 5B or Group 6B atom (IUPAC) where none of the ring carbon atoms are saturated, a heterocyclic ring system and a connecting unit and mixtures thereof. The diradical repeat units are capable of undergoing reversible oxidation or reduction.

In U.S. Pat. No. 4,472,488, M. Maxfield, et al., disclose batteries having electrodes, especially cathodes, having a conjugated backbone polymer such as polyacetylene as an electroactive material and a coating. The coating is formed by the reaction between the oxidized polymer and a pyrrole, thiophene, azulene, furan or aniline compound.

In U.S. Pat. No. 4,543,402, L. Traynor discloses some organic polymers which are "hydroxyphenyl-substituted" and "ether-substituted polypyrroles ("PP") linked through N-adjacent carbon atoms which are compactable, extrudable and are also electrical conductors. These polypyrroles may be tailored for use either as semiconductor having a conductivity in the range from about $10^{-5}$ to about $10^{-2}$ S/cm or a relatively good conductor having a conductivity in the range from about $10^{-2}$ to about $10^2$ S/cm. A method is disclosed for preparing ether-substituted pyrroles.

W. R. Hertler in the *Journal of Organic Chemistry*, Vol. 41, pp. 1412–1416 (1976) discloses the preparation of semiconducting charge transfer polyurethanes by the condensation of 2,5-bis-(2-hydroxyethoxy)-7,7,8,8-tetracyanoquinodimethane with 1,1'-diisocyanatoferrocene and 4,4'-diisocyanatotetrathiafulvalene. These polymes have electrical conductivities of $3\times 10^{-3}$ and $1.66\times 10^{-7}$ ohm$^{-1}$ cm$^{-1}$, respectively. The condensation of 4,4'-bis-(hydroxymethyl)tetrathiafulvalene with 4,4'-diisocyanatotetrathiafulvalene produced a polyurethane which was converted to its iodide by treatment with iodine. The doped iodide polymer has an electrical conductivity of $2\times 10^{-6}$ ohm$^{-1}$ cm$^{-1}$.

T. W. Campbell et al. in *Journal of Organic Chemistry*, Vol. 28, pp. 2069–2079 (1963) describe the use of phospholenes and phospholene oxides, particularly 1-ethyl-3-methyl-3-phospholene oxide as catalysts in converting isocyanates to carbodiimides. A number of diisocyanates were polymerized to produce polymers containing carbodiimide linkages in the repeating unit.

V. M. Hartel et al. in *De Angewandte Makromoleculare Chemie*, Vol. 29/30 (No. 366) pp. 307–347 (1973) disclose the structure and electrical properties of some polyenearylenes, polyheteroarylenes, polyazomethines and the like. Most of the polymers disclosed are connected with CH=CH— units. A few polymers are described wherein a thiophene phenyl and phenyl-diether are connected using —N=CH— units.

Additional U.S. patents of interest in this art include the following: G. G. Miller, et al., U.S. Pat. No. 4,375,427; R. M. Williams, U.S. Pat. No. 4,414,080; P. Denisevich, Jr., et al., U.S. Pat. No. 4,502,980; P. Denisevich, Jr., U.S. Pat. No. 4,505,844; T. Skotheim, U.S. Pat. No. 4,520,086; and A. H. Schroeder, et al., U.S. Pat. No. 4,519,940. For additional information, the review "Conductive Polymers" by C. B. Duke et al., in *Kirk-Othmer: Encyclopedia of Chemical Technology*, 3rd Ed., Vol. 18, pp. 755-793 (1982) is recommended.

The polymers of the present invention are not disclosed or suggested by any of these references. It is desirable to have the additional organic polymers of the present invention that combine electroactive properties with the mechanical and processing advantages found in polymers, for conductive coating and shielding applications, in energy storage and energy conversion devices as battery anodes or cathodes, semiconductors, and in integrated electroptics for switching, logic and display.

SUMMARY OF THE INVENTION

The present invention relates to an electroactive polymer which comprises a charged polymer backbone of recurring units of a radical selected from:

(A) 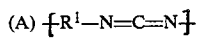  (I)

wherein $R^1$ is a five to twelve atom heterocyclic group;

(B) 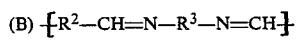  (II)

wherein $R^2$ is selected from a direct bond, —CH=CH—, or

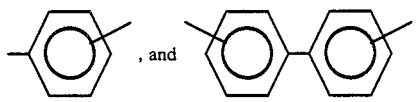

$R^3$ is selected from a direct bond, —CH=CH—, or a six to twelve atom heterocyclic group with the proviso that when $R^3$ is a direct bond or

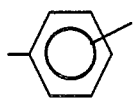

$R^2$ is not

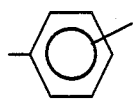 ;

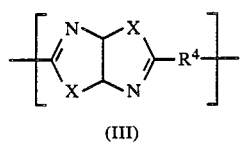 (C)

wherein $R^4$ is selected from a direct bond, —CH=CH—,

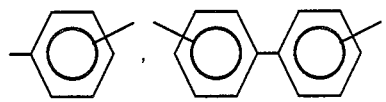

as a five to twelve atom heterocyclic group; and X is oxygen or sulfur;

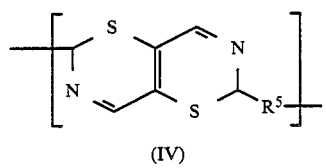 (D)

wherein $R^5$ is selected from a direct bond, —CH=CH—,

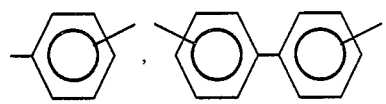

or a five to twelve atom heterocyclic group; and

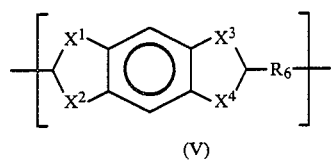 (E)

wherein $R^6$ is a five to twelve atom heterocyclic group; and one of $X^1$ and $X^2$ is nitrogen and the other is oxygen or sulfur, and one of $X^3$ and $X^4$ is nitrogen and the other is oxygen or sulfur; or (F) =Q=N—N=   (VI)

wherein Q is selected from

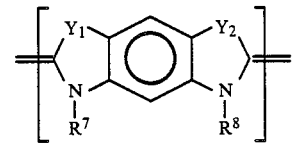

wherein $Y_1$ and $Y_2$ are each independently oxygen or sulfur and $R^7$ and $R^8$ are each independently lower alkyl containing from 1 to 4 carbon atoms;

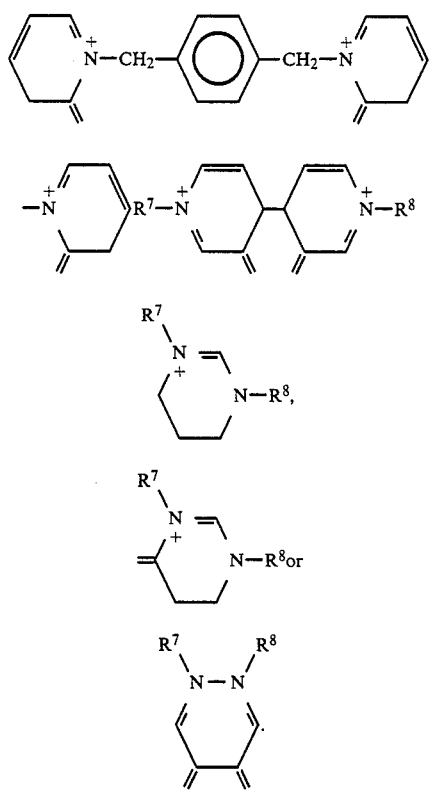

wherein $R^7$ and $R^8$ are as defined hereinabove; or copolymers of Structures I to VI.

In another embodiment, the polymeric structures I, II, III, IV, V and VI above are each individually preferred.

In one embodiment, the polymeric structures I, III, (wherein in Structure III sulfur is preferred) IV, and V described above are preferred.

In still another embodiment, the polymeric structures I and III wherein in III, X is sulfur (S), are preferred.

In embodiments of Structures (I) to (V) where applicable, a six to ten atom fused heterocyclic group is preferred.

DETAILED DESCRIPTION OF THE INVENTION AND PREFERRED EMBODIMENTS

An electroactive polymer is generally defined as a polymer having a conductivity which has been modified with electron acceptor or donor dopants to be greater than the conductivity of the virgin or unmodified state of the polymer. The virgin or unmodified polymer is comprised of the repetitious linking of linear diradical repeat units. Thus, the polymers described herein have a linear backbone. The diradical repeat unit is defined as the smallest structural building block of the polymer backbone having two unsatisfied positions available for linking. These are used to propagate the polymer backbone.

The polymers described herein are capable of undergoing reversible oxidation, reversible reduction or both, to form a linear charged polymer backbone. A charged polymer backbone is defined as a polymer which has been partially or completely oxidized and/or reduced and possesses a net negative or positive charge which is compensated for by the charge compensating ionic dopants. A charge compensating ionic dopant is defined as an ion or group of ions of opposite charge to the charge of the charged polymer backbone.

The enhancement of the electroactive organic polymer described herein is generally accomplished using a sufficient concentration of the organic or inorganic dopant. A virgin homopolymer has a conductivity of about $10^{-15}$ ohms$^{-1}$ cm$^{-1}$. By incorporating from about 10 to 100 mole percent, a charge compensating dopant such as $I^-$ or $I_3^-$, the electroactive polymer increased the conductivity to about $1 \times 10^\circ$ ohm$^{-1}$ cm$^{-1}$. A more preferred range of dopant is between about 10 and 25 mole percent. Preferred electroactive polymers are doped polymers having conductivities greater than about $1 \times 10^{-10}$ ohm$^{-1}$ cm$^{-1}$, more preferably greater than $1 \times 10^{-8}$ ohm$^{-1}$ cm$^{-1}$, and most preferably greater than $1 \times 10^{-4}$ ohm$^{-1}$, cm$^{-1}$. Conductivities in the range of semiconductors are also achieved. Greater concentrations of the charge compensating ionic dopant increases the conductivity into the metallic conductivity range.

The conductivity of the doped polymers are obtained according to ASTM Test No. D-257. The level of dopant added is usually between about 0.1 and 100 mole percent of the polymer.

The conductivity of the polymers and doped polymers of the present invention is best explained by local electronic structure, flexibility and packing density. It is believed that the present polymers are conductive because of intramolecular, intermolecular and tunneling interactions.

The electroactive organic polymers of the present invention are fabricated from the modification or preparation of novel monomers. Compounds which have a number of the stable radical ion structures described herein as the polymers are disclosed as the monomers by S. Hunig in "Stable Radical Ions", *IUPAC Pure and Applied Chem.*, Vol. 15, 109 (1961).

Polymer of Structure (I)

In the preparation of polymers of structure (I) the following general procedure is used. These polymers have a repeating carbodiimide structure ($R^1$—N=C=N—). In the polymers of the invention, $R^1$ is a five to twelve atom heterocyclic group, i.e., the number of atoms in the rings or fused rings present. The preparation of poly(carbodiimides) generally for carbocyclic moieties has been disclosed by T. W. Campbell et al (supra), which is incorporated herein by reference. The heterocyclic groups useful in this invention include, for example,

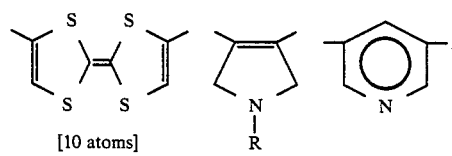

[10 atoms]

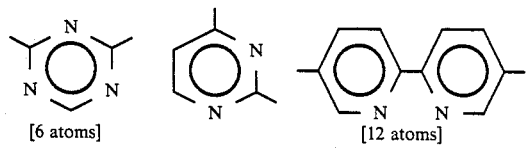

[6 atoms]   [12 atoms]

-continued

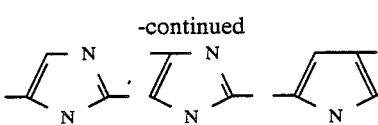

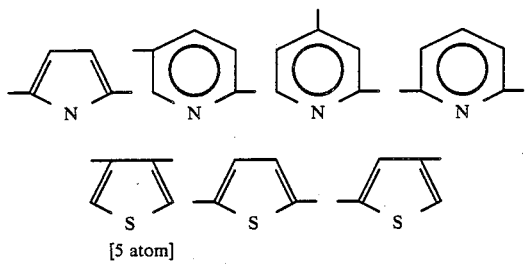

[5 atom]

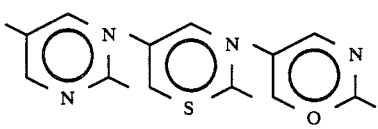

and the like. A more preferred grouping includes those groups cited hereinabove having six to ten atom heterocyclic structure. Any one of the individual structures shown is preferred, depending upon the particular end use of the polymer.

The general method of preparation of the polymer of structure (I) is through the corresponding diisocyanate. Thus for the tetrathiafulvalene structure the diisocyanate as prepared by W. R. Hertler (supra) is treated with a catalytic amount of a phospholene or phospholene oxide, such as 1-ethyl-3-methyl-3-phospholene oxide [See. T. W. Campbell et al., supra]. The poly-(carbodiimide) is obtained by precipitation in water or water/lower alcohol mixtures. The other structures shown in the previous paragraph are either available as the diisocyanates or can be prepared by standard reactions from the corresponding diamine by treatment with excess phosgene followed by dehydrohalogenation.

Polymers of Structure (II)

Polymers of structure (II) are obtained by the following genera procedure. These polymers have a repeating $-[R^2-CH=N-R^3-N=CH]-$ structure. These polymers are obtained by the condensation of a dialdehyde $[O=CH-R^2-CH=O]$ and a diamine $[H_2N-R^3-NH_2]$. Suitable dialdehydes include, for example, gluteraldehyde ($R^2$ is a direct bond), malonydialdehyde ($R^2$ is $-CH=CH-$), terephthaldehyde ($R^2$ is

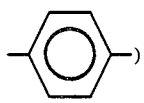)

and the like. Suitable diamines include hydrazine ($R^3$ is a direct bond), malonyldiamine ($R^3$ is $-CH=CH-$), phenylenediamine ($R^3$ is

), guanidine, [$R^3$ is $-C(=NH)-$] and the like. The diamines described in the previous section for structure (I) may be used in this polymerization. The six to ten atom heterocyclic groups are preferred. The 5-member sulfur-containing heterocyclic compound is not a part of Structure (II) in this invention. Further, when $R^3$ is a direct bond or

, $R^2$ is not phenyl.

The condensations of diamines and dialdehydes has been described. In an Air Force Systems Command report titled "New Polymeric Materials Expected to Have Superior Properties for Space-Based Use" (No. RADC-TR-85-129) [Contract No. F-19628-81-0075] published in July, 1985, D. B. Cotts and Z. Reyes disclose the properties of a number of electrically conducting, semiconducting and semi-insulating polymers. Some of the polymers identified by the model system were prepared. The polymers possess relatively high electrical conductivities and unlike the majority of electrically conducting polymers are processible in organic solvents such as dimethyl sulfoxide (DMSO), dimethylacetamide (DMAC), and dimethylformamide (DMF).

A polymer of structure (II) is obtained by combining terephthaldehyde in a dipolar, aprotic solvent, such as dimethylformamide (DMF), in the presence of a catalytic amount of a strong acid such as sulfuric acid, phosphoric acid, trifluoromethanesulfonic acid and the like. Hydrazine in DMF is added and a bright yellow precipitate is obtained which has good conductivity properties.

Polymers of Structure (III)

Polymers of structure (III) are obtained by the following general procedure. These polymers have the heterocyclic repeating unit of structure (III) shown above. These polymers are obtained by the condensation of a dicarboxylic acid [HOOC—$R^4$—COOH] or diacid chloride [Cl(C=O)—$R^4$—(C=O)Cl] and commercially available dithiooxamic acid [NH$_2$—(S)CC(S)NH$_2$] in dehydrating solvents, i.e., $$H_2N(S=)C-C(=S)NH_2 \xrightarrow{H^+} NH_2(SH)C=C(SH)NH_2$$

+

(III) ⟵——— HOOC—$R^4$—COOH

The general procedures described by J. F. Wolfe et al. in U.S. Pat. No. 4,533,693 which is incorporated herein by reference, are adapted for this condensation. Suitable carbon containing dicarboxylic acids include for example oxalic acid ($R^4$ is a direct bond), fumaric acid ($R^4$ is —CH=CH—), terephthalic acid ($R^4$ is

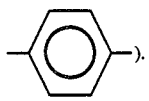).

Additional heterocyclic diacids include those disclosed in the Wolfe patent (supra). An additional heterocyclic group having six to twelve atoms includes the tetrathiafulvalene structure wherein $R^4$ is

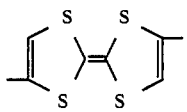

The tetrathiafulvalene-4,4'-dicarboxylic acid is obtained by treating the commercially available tetrathiafulvalene with lithium in the presence of an ether, followed by treatment of the dilithium salt with carbon dioxide. The 4,4'-dicarboxylic acid is also prepared according to the procedure of L. R. Melby, et al., *Journal of Organic Chemistry*, Vol. 39, p. 2456 (1974).

Polymers of Structure (IV)

Polymers of structure (IV) are prepared according to the following procedure. These polymers are condensed dithiadiazine structures. A key intermediate compound is the dithiadiamine of the structure:

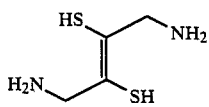 (VII)

which is condensed with a suitable diacid. The intermediate having structure (VII) is obtained by the following sequence:

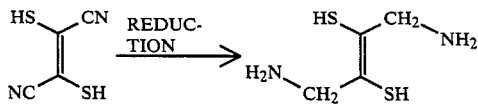

The commercially available dinitrile (*Chem. Ber.*, Vol. 90, 438 (1957)) is reduced using hydrogen and palladium or platinum catalyst.

The carbocyclic and heterocyclic diacids cited above are useful in this condensation, particularly those cited in the Wolfe et al. patent (supra). The 4,4'-dicarboxylic acid of tetrathiafulvalene is also contemplated in this condensation.

Polymer of Structure (V)

The polymer of structure (V) is obtained by the following procedure.

(a) Structure V wherein one of $X^1$ and $X^2$ and one of $X^3$ and $X^4$ is oxygen.

The polymer (V) is obtained by a condensation of substituted diaminobenzenes, e.g.:

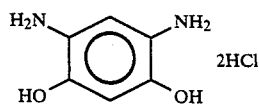 (Va)

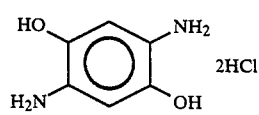 (Vb)

Starting material (Va) is obtained according to Wolfe et al., *Macromolecules*, Vol. 14, p. 909 (1981). Starting material (Vb) is prepared according to Wolfe et al., *J. Polymer Sci.*, Part A-1, Vol. 6, page 1503 (1968).

These compounds are condensed with linear unsaturated dicarboxylic acids, carbocyclic and heterocyclic dicarboxylic acids as described in the Wolfe patent (supra) and those diacids described hereinabove. Equimolar quantities of substituted diamine and diacid are combined in an aprotic solvent such as dimethylformaide (10% solution) or polyphosphoric acid. After heating the reaction mixture for 2 to 6 hrs., the polymer is recovered by pouring into water or water/lower alcohol solutions.

(b) Structure V wherein one of $X^1$ and $X^2$ is sulfur and one of $X^3$ and $X^4$ is sulfur.

Another embodiment of structure (V) is obtained by the condensations of substituted diaminobenzenes, e.g.,:

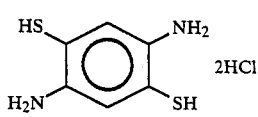 (Vc)

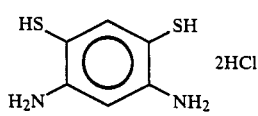 (Vd)

Starting material (Vc) and (Vd) as the 2HCl salt is obtained according to Wolfe, et al., *Macromolecules*, Vol. 14, p. 915 (1981). These compounds are condensed with linear unsaturated dicarboxylic acids, carbocyclic diacids, and heterocyclic diacids as described in the Wolfe patent (supra), and those diacids described hereinabove. The synthesis is as is described hereinabove for the (V) oxygen polymers.

Polymer of Structure (VI)

Embodiments of structure VI are based on the addition of hydrazine to a compound having leaving group such as halogen or ether, in a portion alpha to a quaternary amine as described for dimers by S. Honig et al., *Chem. Ber.*, Vol. 676, p. 36 (1964), which is incorporated herein by reference. Generally, amines other than hydrazine do not work in this synthesis. Some dihalodiquaternary compounds that are used in the reaction include those shown below:

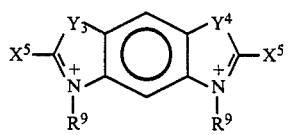

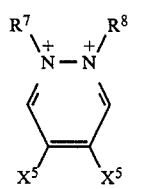

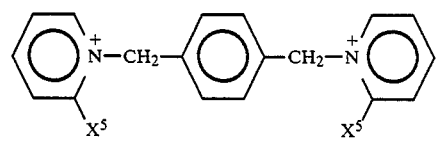

-continued

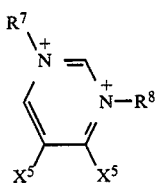

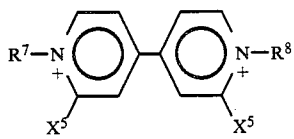

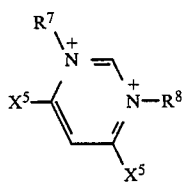

$X^5$=Halogen, pref. Cl, BrY$_3$ or Y$_4$ independently S or O R$^7$, R$^8$, or R$^9$ each independently alkyl of 1 to 4 carbons.

In a typical example, dihalogenated heterocyclic ring such as dichloropyridazine or dichloropyrazine (Aldrich Chemical) is N-alkylated by the addition of an alkyl iodide in a high boiling aprotic solvent like DMF or NMP. The resulting product is treated with an equimolar quantity of anhydrous hydrazine, and pyridine or other acid acceptor. On heating for 4 to 6 hours the product is precipitated into methanol, washed and dried. The recovered polymeric product is expected to have electrical conductivity characteristics.

Copolymers of Structures I to VI

Where appropriate, it is possible to produce copolymers of the polymers shown above as Structures I to VI. Those copolymers of Group II are preferred. In these copolymers, a mixture of equimolar amounts of two dialdehydes are combined in an inert aprotic solvent. Excess anhydrous hydrazine twice molor is added. The reaction medium is heated from between about 50° and 200° C. for between about 2 to 8 hrs. The copolymer is obtained by pouring into excess ice/water, washed and dried. When doped with I$_3$$^-$ or AsF$_5$ these copolymers have good conductivity properties when certain requirements are met. As can be seen in Table 1, those polymers capable of forming a conjugated system show good conductivity, e.g., (a), (b) and (d). Those copolymers which cannot form a conjugated system because of an extra carbon atom in the polymer chain (c), (e) and (f) usually do not exhibit good conductivity properties, even when heavily doped.

Dopants

The dopants useful in this invention induce PF$_6$$^-$, ClO$_4$$^{-1}$, AcF$_4$$^-$, AsF$_5$, BF$_4$$^-$, SbF$_6$$^-$, SbCl$_6$$^-$, SO$_3$CF$_3$$^-$, NO$_3$$^-$, POF$_4$$^-$, CN$^-$, F$^-$, Cl$^-$, Br$^-$, I$^-$, I$_3$$^-$, SiF$_5$$^-$, HSO$_4$$^-$, acetate, benzoate, tosylate or mixtures thereof. Preferred dopants include I$_3$$^-$ and AsF$_5$.

Tractable Polymer Fabrication

In the preparation of the structures I, II, III, IV, V, and VI, the usual degree of polymerization obtained is between about 10 and 100. A more preferred range is between about 25 and 90. The degree of polymerization is determined by molecular weight measurements using standard light scattering or size exclusion chromatography procedures.

After polymerization, articles such as fibers, ribbons, or film are cast or spun from solution or melt. The solution is formed by dissolving the desired polymer in a strong solvent such as dimethylformamide, dimethylacetamide, tetramethylenesulfone, methane-sulfonic acid, mixtures thereof and the like. The solution temperature may be maintained from about 25° C. up to the boiling point of the solvent or 200° C. whichever is lower. Strong acid (such as, sulfuric, phosphoric, trifluoromethane-sulfonic acid) may be added to the solvent to obtain the necessary solution. Subsequently, the article is immersed in a neutralization bath consisting of a bicarbonate salt of alkali metals dissolved in water. Sodium bicarbonate is preferred. The article is then washed with water to a pH of 7 and dried. Optionally, elevated temperatures and reduced pressure are used to accelerate the drying process.

A comparison of the physical properties of some of the homopolymers and copolymers of the present invention is given in Table 1.

The following Preparations and Examples are construed to be illustrative and are not to be considered limiting in any way.

Preparation A 4-4'-Diaminotetrathiafulvalene

To a 1-1 round bottom flask is added 500 ml of anhydrous tetrahydrofuran and (28.6 g) (0.1 mole) of 4,4'-disocyanatotetrathiafulvalene. To this solution, water is slowly added until the evolution of carbon dioxide ceases. The solvent is removed using reduced pressure and the product is used without further purification.

Preparation B

Tetrathiafulvalene-4,4'-dicarboxylic Acid

To a 1'-1 flask is added 0.1 mole (28.6 g) of 4,4'-diisocyanatotetrathiafulvalene, 100 ml of anhydrous tetrahydrofuran and 0.4 mole of metallic lithium is slowly added. The solution is held at room temperature for 1 hr then heated to 50° C. overnight to form the dilithium salt. The solution is then cooled and carbon dioxide is bubbled into the solution until the precipitation of the diacid stops. The dicarboxylic acid is recovered and re-crystallized from hexane/acetone.

TABLE 1
COMPARISON OF VARIOUS PROPERTIES
OF THE THREE HOMOPOLYMERS AND THEIR COPOLYMERS

| | Conductivity (ohm cm)$^{-1}$ | Solubility in Organic Solvents* | Molecular Weight | Density | Stiffness | Stability |
|---|---|---|---|---|---|---|
| H<br>$(=C-C=N-N=)_z$ (a)<br>H | $<10^{-8}$ | Yes | High | High | High | High |
| $I_3^-$ doped | $\sim 10^{-4}$ | Yes | High | High | High | High |
| $AsF_6^-$ doped | $\sim 10^{-1}$ | Yes | High | High | High | High |
| $(=C-\!\!\!\bigcirc\!\!\!-C=N-N=)_z$ Structure (b) | $<10^{-8}$ | No | Low | High | High | High |
| $(=C-C-C=N-N=)_z$ (c) | $<10^{-8}$ | Yes | High | High | Low | High |
| $I_3^-$ doped | $\sim 10^{-8}$ | Yes | High | High | Low | High |
| $[(=C-C=N-N=)_x-(=C-\!\!\!\bigcirc\!\!\!-C=N-N=)_y]_z$ (d) | $<10^{-8}$ | No | Low | Low | Mixed | High |
| $[(=C-C=N-N=)_x-(=C-C-C=N-N=)_y]_z$ (e) | $<10^{-8}$ | Yes | High | Low | Mixed | High |
| $[(=C-C-C=N-N=)_x-(=C-\!\!\!\bigcirc\!\!\!-C=N-N=)_y]_z$ (f) | $<10^{-8}$ | No | Low | Low | Mixed | High |

*organic solvents such as dimethylformamide, dimethylacetamide.
x is between 0.1 and 99.9 mole percent.
y is between 0.1 and 99.9 mole percent; and the sum of x and y is 1.0.
z is between about 25 and 100.
(a)Homopolymer of hydrazine and glutaraldehyde.
(b)Homopolymer of terephthaldehyde and hydrazine.
(c)Homopolymer of malonylaldehyde and hydrazine.
(d)Copolymer of terephthaledyde, gluteraldehyde and hydrazine.
When doped with $I_3^-$, this polymer is expected to have high conductivity.
(e)Copolymer of gluteraldehyde, malonylaldehyde and hydrazine.
(f)Copolymer of terephthaldehyde, malonylaldehyde and hydrazine.

Example 1

Preparation of Polymer of Structure I (a) To a dry 2-l resin kettle is added 500 ml of anhydrous dimethylformamide, 28.6 g (0.1 mole) of anhydrous 4,4'-diisocyanatotetrathiafulvalene and a catalytic amount of 1-ethyl-3-methyl-3-phospholene oxide (0.5 g) in a nitrogen atmosphere. The solution is heated at 100° C. for 5 hr to complete the polymerization. The polymer is cooled and recovered by precipitation by slowly pouring the solution into 2-l of cold water. The polymer is expected to be processible in tetramethylsulfone and to have high conductivity.

General Polymerization Procedure

For Examples 2 to 5

A general condensation procedure is described. The anhydrous reactants (0.1 mole of each) are combined in a dry 2-l resin kettle with solvent, such as anhydrous tetramethylene sulfone (or polyphosphoric acid) (as a 10% solution) in an argon atmosphere. The reactants are stirred for 1 hr at ambient temperature then heated 2 to 8 hr until the polymerization is complete. The condensation polymer is precipitated by pouring into 1-2 l of cold water/ice. The degree of polymerization is determined by molecular weight of the polymer using standard light scattering or size exclusion chromatography techniques.

Example 2

Preparation of Polymer Structure II (a) To a 100-ml round bottom flash is added terephthaldehyde [1.77 g, 0.01 mole], 15 ml of anhydrous dimethylformamide and 2 drops of 84% sulfuric acid. Hydrazine (0.32 g, 0.01 mol) is dissolved in 15 ml of dimethylformamide and added with stirring. An instantaneous yellow color develops with some precipitation of yellow solid. The solution gradually thickens and within 2-min the magnetic stiner stops. Dimethylformamide (40 ml) is added to produce a 75-ml solution. After heating at about 100° C. for 12 hr, the reaction product is poured into 1 l of methanol and a very fine yellow precipitate is obtained.

(b) To a dry 2-l resin kettle is added 250 ml of anhydrous tetramethylsulfone, 13.8 g of dry terephthaldehyde (0.1 mole) and 10.8 g of dry phenylenediamine (0.1 mole) in an argon atmosphere. The solution is stirred and heated to 90° C. for 7 hr then cooled to room temperature. The polymer is recoved by precipitation by pouring the solution into 2-l of cold water. The polymer is expected to be processible in dimethylformamide and to have high conductivity.

(c) Similarly, equimolar amounts of hydrazine and glyoxal are mixed with a ten-fold excess of a suitable organic solvent. Preferably anhydrous reagents are used in a polar aprotic solvent like dimethyl sulfoxide, dimethylformamide, or N-methylpyrolidone. The solution is stirred at room temperature, or heated to about 50° C. with a reflux condenser attached for up to four hours. The resultant solution is precipitated directly into water or methanol, or spun into fibers by wet spinning techniques. Doping with mild oxidizing or reducing agents produces a highly conducting product that is stable towards exposure to air and humidity.

Example 3

Preparation of Polymer of Structure III

[R$^4$ = 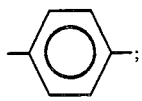

X=S]

(a) In accordance with the general polymerization procedure above, dithiamalonyldiamine is combined with terephthalic acid in a 10% solution in tetramethylene sulfone. After heating for 6 hr, the polymer is cooled and recovered. The polymer is expected to have high conductivity.

(b) In accordance with the general polymerization procedure described above, dithiamalonyldiamine is combined with oxalic acid in a 10% solution in polyphosphoric acid, or with oxalyl chloride in a 10% solution in a aprotic organic solvent. After heating for 6 hours, the solution is cooled and recovered by precipitation into a 10 fold excess of water or methanol, or spun directly into fibers using wet spinning techniques. The polymer is expected to have high conductivity on doping using $I_3^-$.

Example 4

Preparation of Polymer of Structure IV (a) Where R$^5$ is

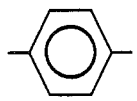

As described above, the dithiadiamine is combined with terephthalic acid, heated for 8 hr and precipitated on 2-1 of ice/water. The polymer is expected to have high conductivity.

(b) As described above in Example 3(b), the dithiadiamine is combined with either oxalic acid or oxalyl chloride in polyphosphoric acid or an aprotic solvent, respectively. After heating for 6 hours the 10% solution is spun into fibers by wet spinning techniques, or precipitated directly into water or methanol. The polymers are expected to have a high conductivity when doped with $I_3^-$ or $AsF_6^-$ and retain good stability as well as being processable from solution.

Example 5

Preparation of Polymer of Structure V (a) As is described above, 2,5-diamino-1,4-benzenedithiodihydrochloride and terephthalic acid are combined and heated at 100° C. for 5 hr. Upon precipitation using ice/water, a black polymer is obtained which is expected to have a high conductivity.

Example 6

Preparation of Polymer of Structure VI (a) A solution of 0.1 mole of 2,5-diamino-1,4-dihydroquinone in an aprotic organic solvent is treated with 0.22 mole of formylchloride. The bisbenzoxazole is halogenated by free radical addition of a halogen to the oxazole carbon. The diquaternary salt is then formed by treatment with 0.22 mole of alkyl chloride. An equimolar amount of anhydrous hydrazine is then added to this compound, in a highly polar aprotic solvent, such as dimethylformamide or dimethylsulfoxide, and the mixture polymerized for four to six hours with heating. After this period of time the polymer is precipitated using an excess of water and methanol. The dried polymer is doped with $I_3^-$ in one case and $AsF_6^-$ in another. Both doped polymers are expected to have good electrical conductivity properties.

(b) Dichloropyrazine (0.1 mole) is N-alkylated by addition of (0.5 mole) of methyl iodide in dry dimethylformamide. The resulting product is treated with 0.1 mole of anhydrous hydrazine and pyridine. After heating for 6 hr, the polymeric product is precipitated by pouring into methanol, washed and dried. The polymeric product when doped with an 80% molar equivalent of $I_3^-$ is expected to have excellent electrical conductivity characteristics.

Example 7

Conductivity Measurements

A powdered sample of the conductive polymer produced in Example 2 above is exposed to $AsF_5$ gas for four hours. The dark powder obtained is pressed into a pellet having a 0.15 cm thickness. The sensitivity is measured using a 10 volt source, multimeter, and shielded plate described in the American Standard Test Method (ASTM) procedure No. D-257, which is incorporated herein by reference. The sample has an average conductivity of about $1.7 \times 10^{-2}$ ohm$^{-1}$ cm$^{-1}$.

While some embodiments of the invention have been shown and described herein, it will be apparent to those skilled in the art that various modification and changes can be made in the structures of the novel conductive polymers and in the dopants and in their applications without departing from the scope and spirit of the present invention. All such modifications and changes coming within the scope of the appended claims are intended to be covered thereby.

We claim:

1. An electroactive polymer which comprises a charged polymer backbone of recurring units selected from:

(A) $+R^1-N=C=N+$  (I)

wherein R$^1$ is a six to twelve atom heterocyclic group;

(B) $+R^2-CH=N-R^3-N=CH+$  (II)

wherein R$^2$ is selected from a direct bond, —CH= CH—, or

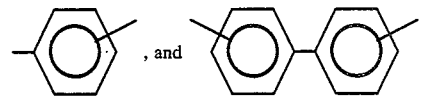

R$^3$ is selected from a direct bond, —CH=CH—, or a six to twelve atom heterocyclic group with the proviso that when R$^3$ is a direct bond or $R^2$ is not

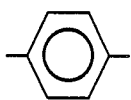

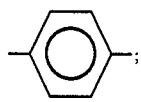;

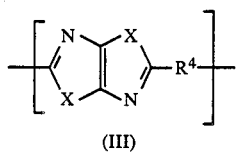

(III)

wherein $R^4$ is selected from a direct bond, —CH=CH—,

, as a six to twelve atom heterocyclic group; and x is oxygen or sulfur;

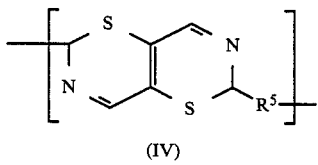 (D)

(IV)

wherein $R^5$ is selected from a direct bond, —CH=CH—, or a six to twelve atom heterocyclic group; and

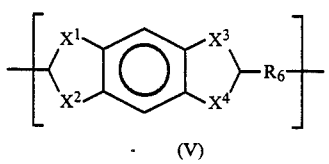 (E)

(V)

wherein $R^6$ is six to twelve atom heterocyclic group; and one of $X^1$ and $X^2$ is nitrogen and the other is oxygen or sulfur, and one of $X^3$ and $X^4$ is nitrogen and the other is oxygen or sulfur, (F) 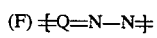 (VI)

wherein Q is selected from

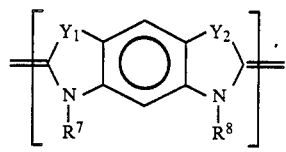

wherein $Y_1$ and $Y_2$ are each independently oxygen or sulfur and $R^7$ and $R^8$ are each independently lower alkyl containing from 1 to 4 carbon atoms;

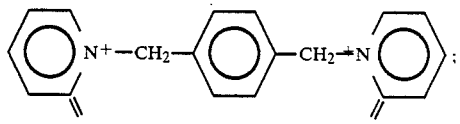;

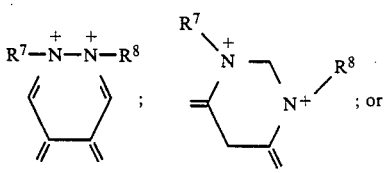; or

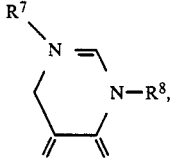, wherein $R^7$ and $R^8$ are as defined hereinabove, and a sufficient concentration of a charge compensating electroactive dopant associated therewith.

2. The electroactive polymer of claim 1 wherein the electroactive dopant comprises an anion selected from $F^-$, $Cl^-$, $Br^-$, $I^-$, $I_3^-$, $ClO_4^-$, $BF_4^-$, $PF_6^-$, $AsF_5^-$, $AsF_6^-$, $NO_3^-$, acetate, benzoate, tosylate or mixtures thereof.

3. The electroactive polymer of claim 2 wherein the electroactive dopant comprises an anion selected from $I^-$, $I_3^-$, $AsF_5^-$, or $AsF_6^-$.

4. The electroactive polymer of claim 1 wherein the polymer selected is structure I, III, IV, V, or VI.

5. The electroactive polymer of claim 1 wherein the polymer selected is structure I.

6. The electroactive polymer of claim 1 wherein the polymer selected is structure II.

7. The electroactive polymer of claim 1 wherein the polymer selected is structure III.

8. The electroactive polymer of claim 1 wherein the polymer selected is structure IV.

9. The electroactive polymer of claim 1 wherein the polymer selected is structure V.

10. The electroactive polymer of claim 1 wherein the polymer selected is structure VI.

11. The electroactive polymer of claim 1 wherein the polymer is selected from structure I or structure III and in structure III, X is sulfur.

12. The electroactive polymer of claim 1 wherein the recurring unit is (=C—C=N—N=).

* * * * *